Jan. 19, 1960 R. ADLER 2,922,119

FREQUENCY HALVING SYNCHRONIZED OSCILLATOR

Original Filed Nov. 12, 1949

ROBERT ADLER
*INVENTOR.*

BY Francis W. Crotty

HIS ATTORNEY.

2,922,119

FREQUENCY HALVING SYNCHRONIZED OSCILLATOR

Robert Adler, Northfield, Ill., assignor to Zenith Radio Corporation, a corporation of Delaware Original application November 12, 1949, Serial No. 126,791, now Patent No. 2,694,158, dated November 9, 1954. Divided and this application April 19, 1954, Serial No. 423,872

8 Claims. (Cl. 331—77)

This invention relates to wave-signal translating apparatus and more particularly to apparatus for translating frequency-modulated carrier waves. This application is a division of copending application, Serial No. 126,791, filed November 12, 1949, for "Wave-Signal Translating Device," now Patent No. 2,694,158, issued November 9, 1954, and assigned to the present assignee.

Frequency modulation signal-receiving systems embodying a frequency-dividing synchronized oscillator for noise rejection and adjacent channel rejection purposes are known to the art. The primary advantage of a frequency-dividing synchronized oscillator in such an application, as contrasted with a synchronized oscillator operating at the signal center-frequency, lies in the reduction of undesirable regeneration. This advantage, however, is ordinarily achieved at the expense of reduced gain, both in the synchronized oscillator and in the preceding amplifier stage. The total number of stages in such a receiver might be reduced if the synchronized oscillator and the preceding amplifier stages were capable of operating at full gain; at the same time, it is desirable to maintain the advantages of frequency division in the synchronized oscillator. These requirements are mutually contradictory in systems known to the art.

It is a primary object of the present invention to provide improved wave-signal translating apparatus embodying a frequency-dividing synchronized oscillator in cooperation with a preceding amplifier stage while permitting both the oscillator and the amplifier to operate at substantially full gain.

It is a further object of the invention to provide such a system in which the amplifier and the synchronized oscillator are capable of providing greater gain than that characteristic of systems presently known to the art.

Still another object of the invention is to provide an improved frequency modulation receiver embodying a frequency-dividing synchronized oscillator and having a smaller number of stages than conventional frequency modulation receivers of this type.

Yet another object of the invention is to provide an improved frequency-dividing synchronized oscillator in which the back-coupling between the oscillator section and the signal injection system is effectively minimized.

In accordance with one feature of the present invention, a frequency-dividing synchronized oscillator comprises an electron-discharge device having a cathode and a pair of anodes; a source of space current potential is provided. An output circuit, tuned to a predetermined frequency, is symmetrically coupled between the respective anodes and the source of space current potential, and a control electrode is included in the device and coupled to one side of the output circuit, unbalanced with respect to the source, for utilizing output-circuit signal energy to vary the electron space current distribution between the anodes to induce oscillatory cu:rrent in the output circuit. An input grid is included in the device between the cathode and the anodes, and a source of input signals, of an average frequency substantially equal to twice the predetermined frequency to which the output circuit is tuned, is coupled to the input grid and to the cathode to synchronize the frequency of the oscillatory current in the output circuit in accordance with the input signals. A screen grid is preferably included in the device between the input grid and the anodes.

In accordance with another feature of the invention, a wave-signal translating system for translating a frequency-modulated carrier-wave signal having a predetermined center-frequency and varying in frequency throughout a predetermined frequency range which is small relative to the center-frequency, comprises an electron-discharge device having a cathode and a pair of anodes; a source of space current potential is provided. An output circuit, tuned to a frequency substantially equal to one-half the center-frequency of the frequency-modulated carrier wave signal, is symmetrically coupled between the respective anodes and the source of space current potential. A control electrode included in the device is coupled to one side of the output circuit, unbalanced with respect to the source, for utilizing output-circuit signal energy to vary the electron space current distribution between the anodes to induce oscillatory current in the output circuit. An input grid is included in the device between the cathode and the anodes. An electron-discharge amplifier, for amplifying the frequency-modulated carrier-wave signal, is coupled to the input grid and to the cathode to synchronize the frequency of the oscillatory current in the output circuit in accordance with the amplified signal. A screen grid is preferably included in the device between the input grid and the anodes. With this arrangement, the amplifier is permitted to operate at substantially full gain.

The features of the present invention which are believed to be novel are set forth with particularity in the appended claims. The invention, together with further objects and advantages thereof, may best be understood, however, by reference to the following description taken in connection with the accompanying drawing, in the several figures of which like reference numerals indicate like elements, and in which:

The term "frequency modulation," as used throughout the specification and claims, is to be understood to refer to any modulation wherein the instantaneous frequency of a carrier wave is varied by the application of a modulating voltage. Thus, the term is generic to the type of modulation in which the instantaneous frequency is directly proportional to the instantaneous value of modulating voltage, and to a modulation system, commonly known as phase modulation, in which the phase of the carrier wave is shifted in direct proportion to the instantaneous value of modulating voltage. In general, the term is to be construed to cover systems in which the instantaneous frequency of the carrier wave varies according to any predetermined plan in accordance with the value of the modulating voltage.

Figure 1:
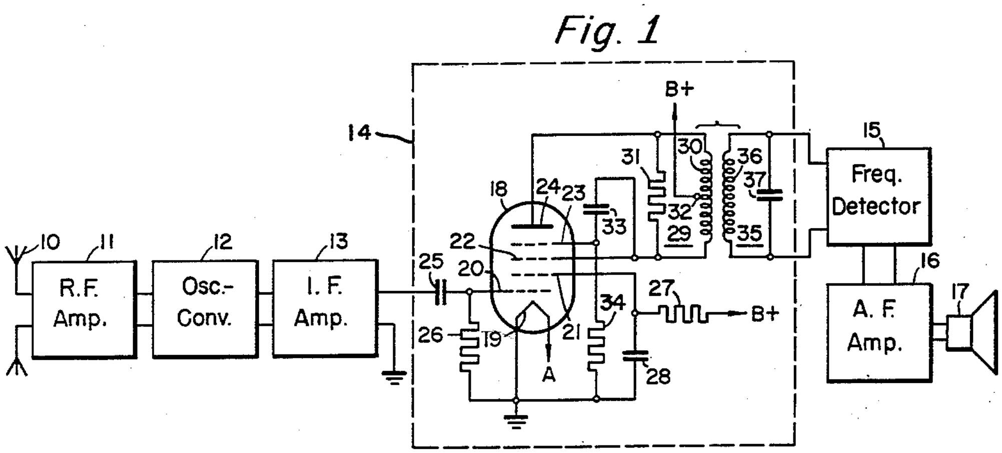
Figure 1 is a schematic diagram of a frequency modulation receiver embodying the present invention.

In Figure 1, an incoming frequency-modulated carrier-wave signal, having a predetermined center-frequency and varying in frequency throughout a predetermined frequency range which is small relative to the center-frequency, is intercepted by an antenna 10 and impressed on a radio-frequency amplifier 11. The amplified wave from radio-frequency amplifier 11 is applied to an oscillator-converter 12 where frequency conversion of the incoming signal is effected in conventional manner. The intermediate-frequency signal from oscillator-converter 12 is amplified by means of an intermediate-frequency amplifier 13, and the amplified intermediate-frequency signal is applied to the input circuit of a frequency-dividing synchronized oscillator 14. The output from synchronized oscillator 14 is impressed on a frequency detector 15, and the audio-frequency signal from frequency detector 15 is amplified by an audio-frequency amplifier 16 and applied to a loudspeaker 17 or other sound-reproducing device.

With the exception of synchronized oscillator 14, the components of the receiver of Figure 1 may be of conventional construction. Frequency detector 15 may advantageously be of the space-charge discriminator type, although the circuit may be adapted to utilize any conventional type of frequency demodulator.

Synchronized oscillator 14 comprises an electron-discharge device 18 having in the order named a filamentary cathode 19, an input grid 20, a screen grid 21, a first anode 22, a control grid 23, and a second anode 24. One terminal of filamentary cathode 19 is grounded while the other terminal is connected to a suitable heating current source, conventionally designated by the letter A. Intermediate-frequency amplifier 13 is coupled to input grid 20 of device 18 by means of a condenser 25, and a resistor 26 is connected between input grid 20 and ground. Screen grid 21 is connected to a suitable source of positive unidirectional operating potential, conventionally designated B+, through a dropping resistor 27, and screen grid 21 is also bypassed to ground by means of a condenser 28.

An output circuit 29, comprising an inductor 30 and a damping resistor 31, is connected between first and second anodes 22 and 24, and a center tap 32 on inductor 30 is directly connected to B+. First anode 22 is coupled to control grid 23 by means of a condenser 33, and a resistor 34 is connected between control grid 23 and ground.

A tuned secondary circuit 35, comprising the parallel combination of an inductor 36 and a condenser 37, is under-critically coupled to output circuit 29. Secondary circuit 35 is coupled to the input terminals of frequency detector 15.

In operation, output circuit 29 is tuned to a frequency substantially equal to one-half the intermediate-frequency of the receiver. The tuning capacity for circuit 29 may conveniently consist of the distributed capacity associated with inductor 30, although this capacity may be provided by a condenser (not shown) connected in parallel with inductor 30 if desired. Control grid 23 is coupled to output circuit 29 by means of condenser 33 and operates to control the electron space current distribution between first and second anodes 22 and 24. Because first anode 22 and control grid 23 are operated at a common alternating potential, a negative resistance is produced across output circuit 29, in a manner well known in the art. Thus, oscillatory current is induced in output circuit 29 at the resonant frequency of that circuit.

When an unmodulated intermediate-frequency signal is impressed between input grid 20 and cathode 19, a positive signal peak is impressed on input grid 20 for each positive peak and for each negative peak of the oscillatory current generated in output circuit 29, since the frequency of the injected signal is twice that of the locally generated signal. Since control electrode 23 operates to switch the electron space current from first anode 22 to second anode 24, the control signal applied to input grid 20 is of a proper phase to support the oscillation.

From another viewpoint, device 18 and its associated circuit components function as a mixer-oscillator in which the injected signal has an average frequency of twice that of the local oscillator. Local oscillations are induced in output circuit 29, and the local oscillator signal is injected on oscillator grid 23. At the same time, the intermediate-frequency signal is applied to input grid 20. In accordance with the invention, the local oscillator signal is made substantially equal to one-half the average intermediate-frequency, so that the beat signal produced by intermodulation has an average frequency equal to that of the local oscillator. The beat signal is impressed on the oscillator tuned circuit 29 and locks the oscillator in step in the same manner as in conventional fundamental-frequency synchronized oscillators. The mechanism of synchronization is well-known in the art and is therefore not described in detail.

Actual experiments have revealed that it is possible to insure oscillation on the steepest part of the oscillator grid characteristic by selecting appropriate values of unidirectional operating potentials for the several electrodes. Because the steepest portion of the oscillator characteristic is also the most straight, second harmonic components in the output circuit 29 may be reduced to a minimum by balanced or symmetrical operation. Consequently, substantially no back-coupling occurs at the second harmonic of the oscillator frequency, which is also the average intermediate-frequency, with the result that the preceding intermediate-frequency amplifier may be operated at full gain.

Secondary circuit 35 is tuned to the free-running frequency of the oscillator and is under-critically coupled to output circuit 29 to increase the synchronization sensitivity of synchronized oscillator 14 within the lock-in range. When an under-critically coupled secondary circuit is used, the resulting susceptance of the primary circuit 29 at frequencies near the free-running frequency is reduced, with the result that the strength of the synchronizing signal required for lock-in over the modulation range is appreciably reduced.

As is well known in the art, the use of a synchronized oscillator in a frequency modulation receiver is particularly advantageous because of the greater effective gain which may be obtained in that manner. By using a frequency-dividing synchronized oscillator, in which the output signal is of a frequency different from either the intermediate frequency or the frequency of the radiated wave, overall regeneration problems are materially reduced. Furthermore, substantial limiting action is obtained, so that the synchronized oscillator may obviate the necessity for the amplitude limiter included in conventional frequency modulation receivers.

While prior art receivers of the type employing synchronized oscillators afford greater gain than conventional superheterodyne receivers using amplitude limiting, the prior arrangements have afforded these advantages with an accompanying sacrifice in the amplification obtainable in the intermediate-frequency amplifier stage preceding the synchronized oscillator. This sacrifice in gain is caused by back-coupling between the output circuit of the synchronized oscillator and its input circuit, so that the input impedance of the oscillator tube is reduced. In accordance with the present invention, back-coupling from the output circuit of the synchronized oscillator to the preceding intermediate-frequency amplifier is effectively minimized by selecting a free-running oscillator frequency of substantially one-half the average intermediate-frequency and by utilizing a balanced or symmetrical oscillator system so that substantially no second harmonic components are produced.

In the system of Figure 1, satisfactory operation in accordance with the invention has been obtained with an electron-discharge device 18 of a type in which the first anode 22 is constructed as a grid. With a tube of this type, an appreciable loss of input transconductance is encountered due to the interception of electrons from cathode 19 by the first anode 22. A further loss of input transconductance is attributed to the fact that, of the electrons rejected by control grid 23, a large number are collected by screen grid 21 rather than by first anode 22. These losses may be substantially avoided by the use of an electron-discharge device of special construction, as illustrated in cross-section in Figure 2.

Figure 2:
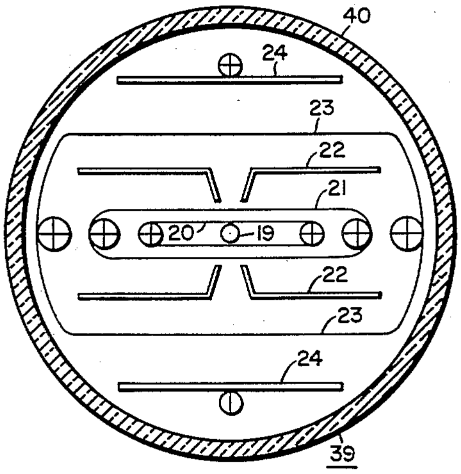
Figure 2 is a cross-sectional view of an improved electron-discharge device which is particularly adapted for use in a receiver of the type exemplified by Figure 1; and, Figure 3 is a schematic diagram of a frequency-dividing synchronized oscillator constructed in accordance with the present invention and embodying the electron-discharge device of Figure 2.

In Figure 2, an electron-discharge device 39 comprises a plurality of conductive electrodes disposed within an evacuated envelope 40. The device comprises a filamentary cathode 19 surrounded by a first grid 20. A screen grid 21 is substantially concentrically disposed with respect to input grid 20. Grids 20 and 21 are preferably of the parallel-wire type, and it is preferred that the turns of these two grids be maintained in substantial alignment, so that outgoing electrons emitted from cathode 19 are precluded from intercepting screen grid 21. The first anode 22 comprises a pair of slotted plates which are so dimensioned that all outgoing electrons are directed through a central slot. This end is accomplished by virtue of the sharp concentration of electron emission from cathode 19 which is occasioned by the use of a filamentary cathode in conjunction with flat accelerating electrodes.

Control grid 23, which may be of the parallel wire type, surrounds the two first anode plates 22. The second anode 24 comprises a pair of plates suitably disposed to collect all electrons emerging from control grid 23.

In order to minimize the loss in transconductance resulting from the division of electrons rejected by control grid 23 between screen grid 21 and first anode 22, the first anode plates are formed to be impervious to electrons except for a narrow region opposite the cathode. Elections rejected by control grid 23 are caused to diverge by the action of the space charge adjacent that grid and are, for the most part, collected by the solid wing portions of the first anode. Consequently, the negative transconductance of control grid 23 with respect to first anode 22 approaches in magnitude its positive transconductance with respect to second anode 24. Suitable supporting posts are provided for the various electrodes in a manner well known in the art. The novel structural features of the discharge device illustrated in Figure 2 are specifically claimed in Patent No. 2,694,158.

Figure 3:
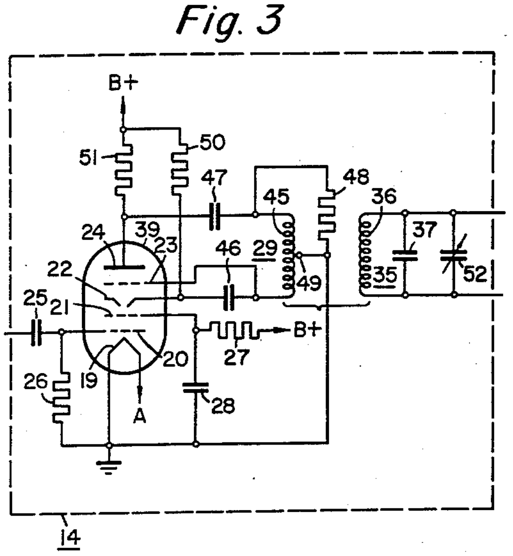

Figure 3 is a schematic diagram of a frequency-dividing synchronized oscillator embodying the electron-discharge device of Figure 2 and constructed in accordance with the present invention. Output circuit 29 comprises a self-resonant inductor 45 coupled to first and second anodes 22 and 24 by means of condensers 46 and 47 respectively. Control grid 23 is directly connected to a point intermediate condenser 46 and the lower terminal of inductor 45. A damping resistor 48 is connected between the upper terminal of inductor 45 and a center tap 49 on that inductor, center tap 49 being grounded. First and second anodes 22 and 24 are connected to B+ through voltage-dropping resistors 50 and 51 respectively, which are suitably selected for balanced or symmetrical operation of the oscillator. A trimmer condenser 52 is included in the secondary circuit 35. In all other respects, the circuit of Figure 3 is identical with synchronized oscillator 14 of Figure 1.

The operation of the circuit of Figure 3 is similar in most respects to that of synchronized oscillator 14 of Figure 1. By using a specially constructed electron-discharge device, of the type illustrated in Figure 2, substantially full realization of the maximum input transconductance is obtained, and maximum gain is assured in the synchronized oscillator as well as in the preceding amplifier stage.

Purely by way of illustration, and in no sense by way of limitation, the beneficial results of the invention have been obtained with the circuit of Figure 3 using an intermediate-frequency of 8.6 megacycles and an output circuit 29 tuned to a frequency of 4.3 megacycles. A damping resistor 48 of 12,000 ohms was used. Suitable operating potentials were provided for electrodes 21, 22, and 24 by using voltage dropping resistors 27, 50, and 51 of 100,000, 118,000, and 82,000 ohms respectively. With these circuit components, completely satisfactory operation was obtained with a B+ voltage in the range from 70 to 90 volts. In practice, it has been found that the performance of a receiver embodying the circuit of Figure 3 may be equivalent with that obtainable with a conventional frequency modulation receiver using an amplitude limiter and one additional stage of intermediate-frequency amplification. Thus, the invention is particularly advantageous for applications in a battery-operated frequency modulation receiver, for example of the portable type.

It is also possible, in accordance with the invention, to provide a synchronized oscillator in which oscillatory current is induced in the output circuit by means of a deflection control electrode for switching the entire electron space current from one anode to the other. Electron-discharge devices of suitable construction for this application are well known in the art and have been used, for example, in mixer applications. The term "control electrode" in the appended claims is therefore intended to be generic to a control grid and to a deflection type control electrode as well as to any equivalent structure for controlling the electron space current distribution between two anodes.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. A frequency-dividing synchronized oscillator comprising: an electron-discharge device having a cathode and a pair of anodes; a source of space current potential; an output circuit symmetrically coupled between said respective anodes and said source of space current potential and tuned to a predetermined frequency; a control electrode included in said device and coupled to one side of said output circuit, unbalanced with respect to said source, for utilizing output-circuit signal energy to vary the electron space current distribution between said anodes and induce oscillatory current in said output circuit; an input grid included in said device between said cathode and said anodes; and a source of input signals of an average frequency substantially equal to twice said predetermined frequency coupled to said input grid and to said cathode to synchronize the frequency of said oscillatory current with said input signals.

2. A frequency-dividing synchronized oscillator comprising: an electron-discharge device having a cathode and a pair of anodes; a source of space current potential; an output circuit symmetrically coupled between said respective anodes and said source of space current potential and tuned to a predetermined frequency; a control grid included in said device between said anodes and coupled to one side of said output circuit, unbalanced with respect to said source, for utilizing output-circuit signal energy to vary the electron space current distribution between said anodes and induce oscillatory current in said output circuit; an input grid included in said device between said cathode and said anodes; and a source of input signals of an average frequency substantially equal to twice said predetermined frequency coupled to said input grid and to said cathode to synchronize the frequency of said oscillatory current with said input signals.

3. A frequency-dividing synchronized oscillator comprising: an electron-discharge device having in the order named a cathode, an input grid, a first anode which is impervious to electrons except for a narrow region opposite said cathode, and a second anode; a source of space current potential; an output circuit symmetrically coupled between said respective anodes and said source of space current potential and tuned to a predetermined frequency; a control grid included in said device between said anodes and coupled to one side of said output circuit, unbalanced with respect to said source, for utilizing output-circuit signal energy to vary the electron space current distribution between said anodes and induce oscillatory current in said output circuit; and a source of input signals of an average frequency substantially equal to twice said predetermined frequency coupled to said input grid and to said cathode to synchronize the frequency of said oscillatory current with said input signals.

4. A frequency-dividing synchronized oscillator comprising: an electron-discharge device having in the order named a filamentary cathode, an input grid, a first anode which is impervious to electrons except for a narrow region opposite said cathode, and a second anode; a source of space current potential; an output circuit symmetrically coupled between said respective anodes and said source of space current potential and tuned to a predetermined frequency; a control grid included in said device between said anodes and coupled to one side of said output circuit, unbalanced with respect to said source, for utilizing output-circuit signal energy to vary the electron space current distribution between said anodes and induce oscillatory current in said output circuit; and a source of input signals of an average frequency substantially equal to twice said predetermined frequency coupled to said input grid and to said cathode to synchronize the frequency of said oscillatory current with said input signals.

5. A frequency-dividing synchronized oscillator comprising: an electron-discharge device having a cathode and a pair of anodes; a source of space current potential; an output circuit symmetrically coupled between said respective anodes and said source of space current potential and tuned to a predetermined frequency; a control electrode included in said device and coupled to one side of said output circuit, unbalanced with respect to said source, for utilizing output-circuit signal energy to vary the electron space current distribution between said anodes and induce oscillatory current in said output circuit; an input grid included in said device between said cathode and said anodes; a screen grid included in said device between said input grid and said anodes; and a source of input signals of an average frequency substantially equal to twice said predetermined frequency coupled to said input grid and to said cathode to synchronize the frequency of said oscillatory current with said input signals.

6. A wave-signal translating system for translating a frequency-modulated carrier wave signal having a predetermined center frequency and varying in frequency throughout a predetermined frequency range which is small relative to said center frequency comprising: an electron-discharge device having a cathode and a pair of anodes; a source of space current potential; an output circuit symmetrically coupled between said respective anodes and said source of space current potential and tuned to a frequency substantially equal to one-half said center frequency; a control electrode included in said device and coupled to one side of said output circuit, unbalanced with respect to said source, for utilizing output-circuit signal energy to vary the electron space current distribution between said anodes and induce oscillatory current in said output circuit; a screen grid included in said device between said input grid and said anodes; an input grid included in said device between said cathode and said anodes; and an electron-discharge amplifier for amplifying said signal coupled to said input grid and to said cathode to synchronize the frequency of said oscillatory current with said amplified signal.

7. A wave-signal translating system for translating a frequency-modulated carrier-wave signal having a predetermined center frequency and varying in frequency throughout a predetermined frequency range which is small relative to said center frequency comprising: an electron-discharge device having a cathode and a pair of anodes; a source of space current potential; an output circuit symmetrically coupled between said respective anodes and said source of space current potential tuned to a frequency substantially equal to one-half said center frequency; a control grid included in said device between said anodes and coupled to one side of said output circuit, unbalanced with respect to said source, for utilizing output-circuit signal energy to vary the electron space current distribution between said anodes and induce oscillatory current in said output circuit; an input grid included in said device between said cathode and said anodes; a screen grid included in said device between said input grid and said anodes; an electron-discharge amplifier for amplifying said signal; and means coupling said amplifier to said input grid and to said cathode to synchronize the frequency of said oscillatory current with said amplified signal.

8. A wave-signal translating system for translating a frequency-modulated carrier-wave signal having a predetermined center frequency and varying in frequency throughout a predetermined frequency range which is small relative to said center frequency comprising: an electron-discharge device having in the order named a filamentary cathode, an input grid, a screen grid, a first anode which is impervious to electrons except for a narrow region opposite said cathode, and a second anode; a source of space current potential; an output circuit symmetrically coupled between said respective anodes and said source of space current potential and tuned to a frequency substantially equal to one-half said center frequency; a control grid included in said device between said anodes and coupled to one side of said output circuit, unbalanced with respect to said source, for utilizing output-circuit signal energy to vary the electron space current distribution between said anodes and induce oscillatory current in said output circuit; an electron-discharge amplifier for amplifying said signal; and means coupling said amplifier to said input grid and to said cathode to synchronize the frequency of said oscillatory current with said amplified signal.

References Cited in the file of this patent

UNITED STATES PATENTS

| | | |
|---|---|---|
| 2,180,369 | Philpott | Nov. 21, 1939 |
| 2,252,580 | Rothe et al. | Aug. 12, 1941 |
| 2,356,201 | Beers | Aug. 22, 1944 |
| 2,379,721 | Koch | July 3, 1945 |
| 2,411,003 | Sands | Nov. 12, 1946 |
| 2,440,073 | Bradley | Apr. 20, 1948 |
| 2,440,653 | Corrington | Apr. 27, 1948 |
| 2,452,811 | Usselman | Nov. 2, 1948 |
| 2,507,409 | Kalmus | May 9, 1950 |
| 2,513,763 | Vilkomerson | July 4, 1950 |
| 2,694,158 | Adler | Nov. 9, 1954 |
| 2,775,690 | Jonkers et al. | Dec. 25, 1956 |